United States Patent [19]

Freyman

[11] Patent Number: 4,809,996
[45] Date of Patent: Mar. 7, 1989

[54] SHOPPING CART CAPABLE OF CLIMBING STAIRS

[76] Inventor: Alexander Freyman, 1903 Ocean Ave., Apt. B-8, Brooklyn, N.Y. 11230

[21] Appl. No.: 238,268
[22] Filed: Aug. 29, 1988
[51] Int. Cl.⁴ .............................................. B62B 5/02
[52] U.S. Cl. .................................. 280/5.32; 280/641; 280/651
[58] Field of Search ................... 292/259 R; 280/639, 280/641, 642, 651, 652, 654, 5.32, DIG. 4

[56] References Cited

U.S. PATENT DOCUMENTS

| | | | |
|---|---|---|---|
| 3,514,123 | 5/1970 | Ihjeski | 280/652 |
| 3,797,847 | 3/1974 | Lindsey et al. | 280/654 |
| 4,199,171 | 4/1980 | Betts | 280/652 |
| 4,339,141 | 7/1982 | Thiboutot | 280/652 |
| 4,722,538 | 2/1988 | Freyman | 280/5.32 |

Primary Examiner—Charles A. Marmor
Assistant Examiner—Michael Mar

[57] ABSTRACT

An improved collapsable shopping cart capable of climbing stairs that employs a direct pivotal connection between two tubular frames, each frame having two spaced apart legs carrying wheels. The novel construction includes a bracket supporting the basket of the cart in an erected position and a handle for manual releasing the bracket and thus putting the cart in a collapsed position convenient for storage.

1 Claim, 2 Drawing Sheets

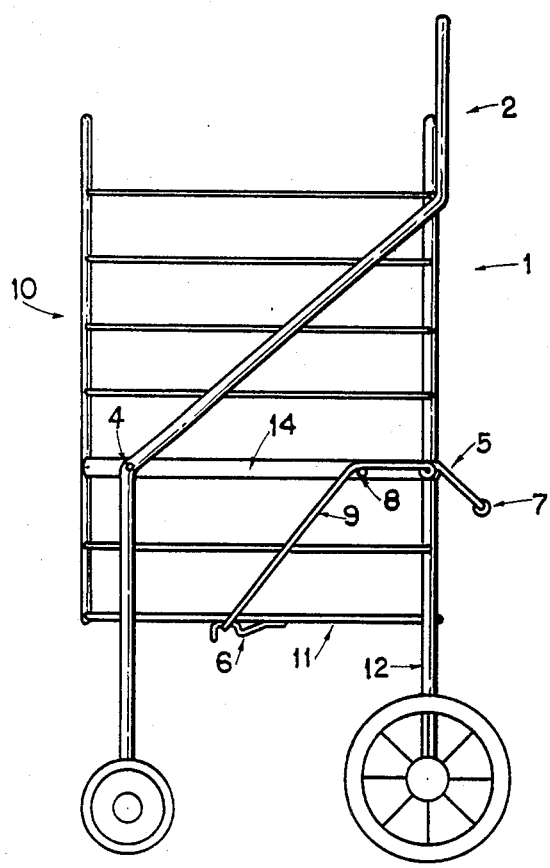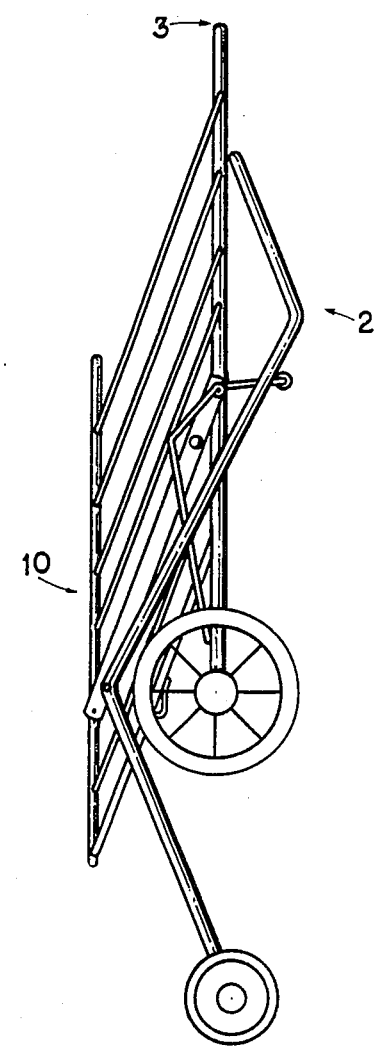
FIG. 1
FIG. 2

SHOPPING CART CAPABLE OF CLIMBING STAIRS

BACKGROUND OF THE INVENTION

There were some attempts made recently to provide stairclimbing devices of different kinds which might be used for carrying up- and downstairs various objects, either heavy, or inconvenient in handling.

One collapsable shopping cart construction (U.S. Pat. No. 4,722,538) employs a combination of a movable and immovable frames, pivotably connected to each other by means of a pair of diagonal links. In an upright position the construction is supported by a pair of braces incorporated with a crossbar, slidably positioned over the vertical rear legs of the cart.

This type of construction, although reliable and sturdy, appeared rather costly in production and complicated in operation. Besides, the braces, the crossbar and diagonal links all together create considerable extra weight, which is not desirable in a shopping cart.

SUMMARY OF THE INVENTION

The primary object of the invention is to provide, in a construction as described above, a means for direct pivotal connection of the movable frame to the foldable basket of the cart, thus making the diagonal links unnecessary. Another object of the invention is to replace the braces-and-crossbar assembly with a bracket, supporting the basket of the cart, both improvements making the cart lighter, less expensive in production and simpler in operation.

BRIEF DESCRIPTION OF THE DRAWINGS

FIG. 1 is a side elevational view of an improved shopping cart constructed in accordance with the invention.

FIG. 2 is a side elevational view of the cart in a collapsed condition for storage purposes.

DETAILED DESCRIPTION OF THE INVENTION

Figure 3:
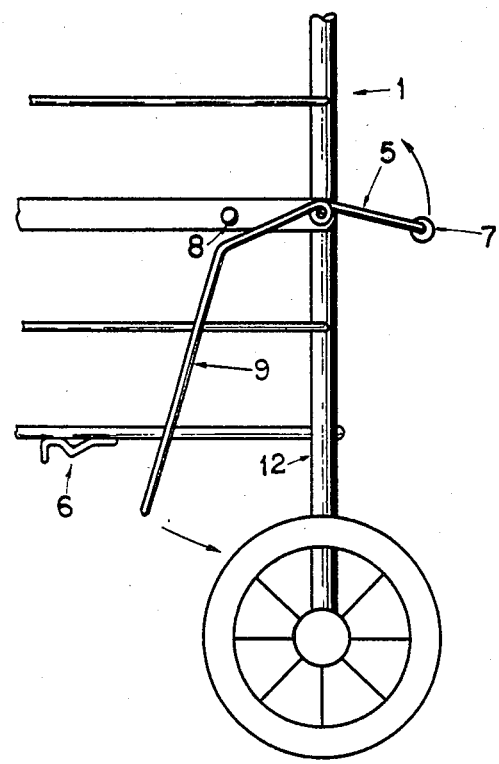
FIG. 3 is a partial side elevational view, showing the bracket released from the engagement with the catch.

Referring to the drawings in particular, in a shopping cart shown on FIG. 1, which normally includes an immovable frame assembly generally designated 1, carrying a foldable basket 10; and a movable frame assembly generally designated 2, each frame assembly having a pair of spaced apart legs carrying wheels, the invention comprises a pivotal attachment of the movable frame assembly 2 directly to the side-rails 14 of the basket 10 by means of pivots 4.

Figure 4:
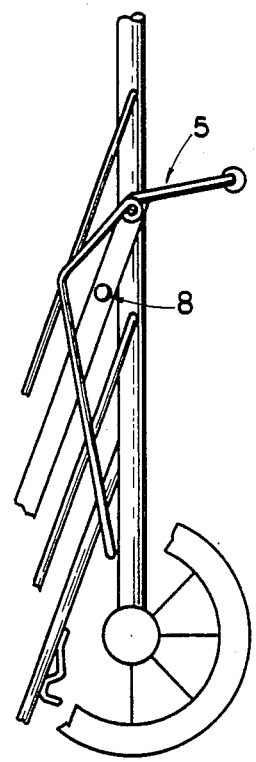
FIG. 4 is a partial side elevational view, showing the relative position of the pawl and the bracket when the cart is in a collapsed condition.

The invention further comprises a bracket 5, pivotably mounted onto the lower portion of the immovable frame assembly 1 and alterable between an erected and collapsed positions as illustrated in FIGS. 1, 2 and 4. In the erected position the bracket 5 supports the basket 10 unfolded (see FIG. 1); when the bracket 5 collapses, the basket folds down, as shown in FIGS. 2 and 4.

The invention further comprises catches 6, fixedly attached to the bottom rods 11 of the basket 10, said catches, when engaged with the bracket 5, prevent the bracket 5 from sliding along the bottom rods 11 of the basket 10 when the front legs carrying wheels are lifted above the ground.

Normally the bracket 5 is held in the erected position, its side-bars 9 being propped up from below by the semispherical pawls 8 positioned onto the side-rails 14 of the basket 10. In order to fold the basket, the user pulls the handle 7 of the bracket 5 upward, as shown in FIG. 3. The side-bars 9 pass over the pawls 8, overcoming their resilient resistance and disengage from the catches 6. The user then lifts the cart by the top portion 3 of the immovable frame assembly 1, and the basket, no longer supported by the bracket 5, folds down in the position shown in FIG. 2.

When the basket collapses, the bracket 5, in its downward movement meets with the rear legs 12 of the cart and rests against them, so that the pawls 8, as the basket collapses further down, pass under the side-bars 9 of the bracket 5 and finally appear below the side-bars 9, as shown in FIG. 4, so that when the basket 10 is unfolded again, the pawls 8, now being underneath the side-bars 9, in their upward movement will push the side-bars 9 upward and support them in the erected position shown in FIG. 1.

Figure 5:
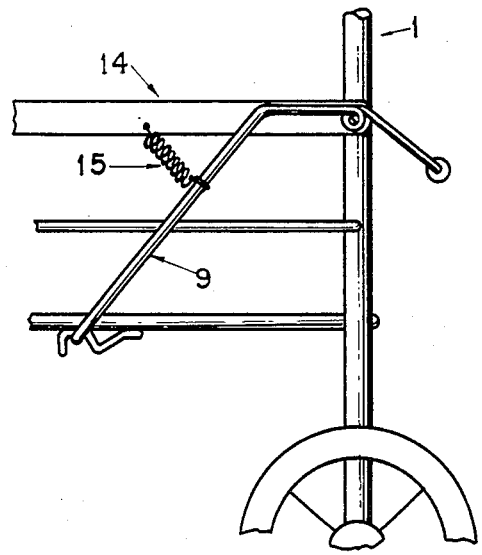
FIG. 5 is a partial side elevational view illustrating the manner in which the spring is mounted.

Instead of the described pawls 8 there may be employed springs 15, mounted on the basket side-rails 14 and engaged with the side-bars 9. As shown in FIG. 5, springs 15 keep the bracket 5 in constant engagement with the catches 6; the bracket 5 can be disengaged manually from the catches 6 by pulling the handle 7 upward in the manner described above.

In all the rest of the structure described above functions similar to that known in the prior art e.g. U.S. Pat. No. 4,722,538.

What is claimed is:

1. A shopping cart capable of climbing stairs of the type including an immovable frame assembly having two spaced apart vertical leg members, a collapsible basket formed by two spaced apart vertical side members and a plurality of rods pivotally connected between said leg members and said side members, a movable frame assembly having a handle portion at its upper end and two spaced apart legs which are pivotally connected to the sides of said basket, and wheel means secured to the lower ends of said legs of said movable and immovable frame assemblies, said cart being alterable between erected and collapsed positions, wherein the improvement comprises:

a side rail pivotally connected between each of said vertical leg members of said immovable frame and each of said vertical side members, each leg of said movable frame assembly being pivotally connected to a corresponding one of said side rails;

a flexible U-shaped bracket for locking said cart in an erected position, said bracket having a lowermost portion extending below the lowermost rods of said basket for engaging a catch member mounted thereon when said cart is in said erected position and said bracket having two spaced apart leg portions extending upwardly from said lowermost portion, each one of said leg portions being pivotally connected to a corresponding one of said vertical leg members of said immovable frame;

a handle connected between the outermost ends of said leg portions of said bracket for manually releasing said bracket from said catch member, thereby collapsing said cart; and pawl means attached to each side rail and extending outwardly therefrom, wherein said pawl means is adapted to engage said leg portions of said bracket, when said cart is moved from said collapsed position to said erected position, for automatically moving the lowermost portion of said bracket into locking engagement with said catch member.

* * * * *